Figure 1:
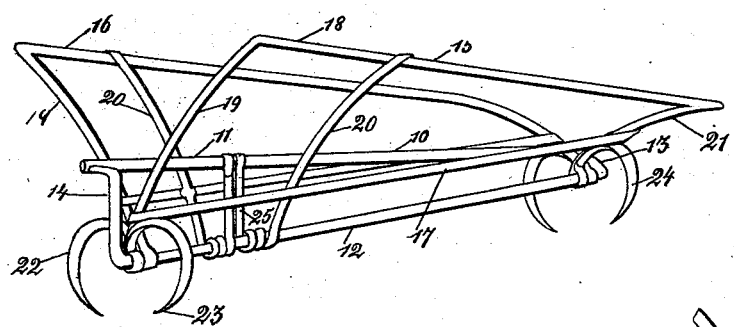

No. 724,003. PATENTED MAR. 31, 1903.
G. GRAMKOW.
ANIMAL POKE.
APPLICATION FILED AUG. 15, 1902.

NO MODEL.

Witnesses:
Henry Manger.
Mont McAlister

Inventor: Gustav Gramkow.
by Quirig & Lane, Attys.

THE NORRIS PETERS CO., PHOTO-LITHO., WASHINGTON, D. C.

UNITED STATES PATENT OFFICE.

GUSTAV GRAMKOW, OF MESERVEY, IOWA.

ANIMAL-POKE.

SPECIFICATION forming part of Letters Patent No. 724,003, dated March 31, 1903.

Application filed August 15, 1902. Serial No. 119,822. (No model.)

*To all whom it may concern:*

Be it known that I, GUSTAV GRAMKOW, a citizen of the United States, residing at Meservey, in the county of Cerro Gordo and State of Iowa, (whose post-office address is Meservey, Iowa,) have invented a new and useful Animal-Poke, of which the following is a specification.

The objects of my invention are to provide an animal-poke of simple, durable, and inexpensive construction which can readily be attached to the animal and which can also be readily detached from it.

A further object is to provide an animal-poke which is made of very light material, the prongs of which can be readily attached to the hide of the animal, said prongs being made of a metallic substance which will not cause poisoning.

A further object is to provide an animal-poke the top portion of which will engage a wire of a fence through which the animal has pushed its head and cause the animal to step rearwardly on account of the drawing of the hide caused by the engagement of the poke with the wire of the fence.

A further object is to provide an animal-poke which is intended to be used when the animal is inclosed by wire fences and will prevent the animal from pushing the wires in the fences down and breaking them.

A further object is to provide a device of the class referred to which when once adjusted to the neck of the animal will always remain in position in which it has been fixed until it is desirable to remove it.

A further object is to provide an animal-poke which will rest lightly on the upper portion of the neck of the animal and which on account of its size will not be troublesome when the animal is feeding.

My invention consists in certain details in the construction, arrangement, and combination of the various parts of the device whereby the objects contemplated are obtained, as hereinafter set forth, pointed out in my claims, and illustrated in the accompanying drawings, in which—

Figure 3:
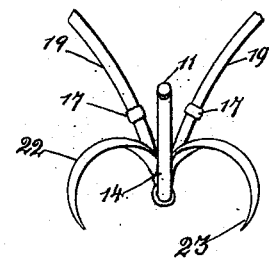
Figure 2:
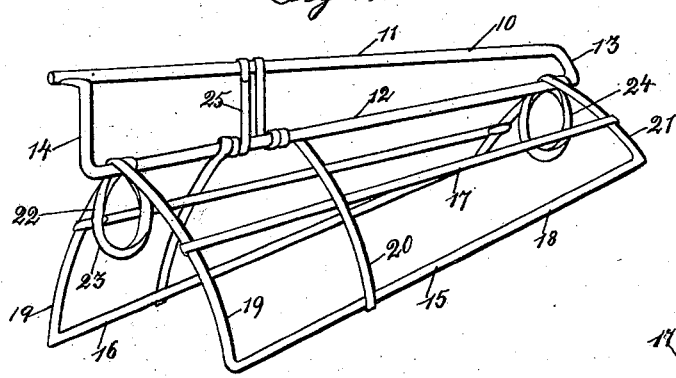
Figure 4:
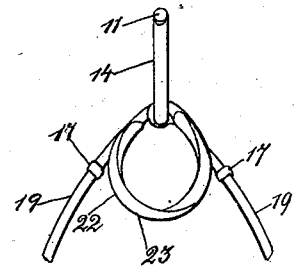

Figure 1 is a perspective view of the complete device with the side portions in their elevated positions as the poke is before being placed in engagement with the neck of the animal. Fig. 2 is a perspective of the same, showing the side pieces in their lowered position, the position in which these arms are when they are in engagement with the neck of the animal. Fig. 3 is a front end elevation of the device with the arms in the position shown in Fig. 1. Fig. 4 is a front elevation of the poke with the arms in the closed position.

Referring to the accompanying drawings, I have used the reference-numeral 10 to indicate the body portion of my poke. This body portion has the metal rod 11, forming its upper side, and the metal rod 12, forming its lower side, and the portion 13 forms the rear of the body portion 10. At the front end of the body portion is the upright 14, connecting the forward ends of the rods 11 and 12 of the body portion. The rod 11 is slightly longer than the rod 12, so that it projects farther forward than does the rod 12. The entire body portion is made of a single piece of wire and is bent into the shape shown in the drawings and described above. The upright 14, in front of which the forward end of the rod 11 extends, is designed to engage a wire in the fence through which the animal pokes its head.

To the rod 12 of the body portion of the poke I have mounted the side portions 15 and 16, each of said side portions comprising two metal bars 17 and 18, running longitudinally of the poke and substantially parallel with the rod 12 of the body portion. The bars 17 and 18 are connected with each other and with the rod 12 of the body portion by the cross-pieces 19, 20, and 21, said cross-pieces being curved slightly from rod 12 of the body portion outwardly and then rearwardly to the bar 18 of the side portions, so that on the curve which is formed by these cross-pieces the bar 17 is somewhat higher relative to the body than the bar 18 and the rod 12. These arms 19, 20, and 21 are also substantially parallel with each other. They are made curved in shape, so that they will readily fit over the neck of the animal and be retained firmly against its neck. The cross-pieces 21 of the side portions are not curved as much as the cross-pieces 19, for the reason that the animal's neck is broader where the rear end of the poke is attached than it is at the place where the front end is attached.

Attached to the inner end of the cross-pieces 19 and extending between these cross-pieces and below the metal rod 12 are the prongs 22, the lower ends 23 of said prongs being designed to overlap each other and form a substantially circular opening between them when the side portions are at their lower limited movement and the prongs in their closed position. The prongs 24 are attached to the cross-pieces 21 at the rear of the poke in a corresponding position to the prongs at the front of the poke. These prongs are substantially parallel with each other. The prongs 22 and 24 are so attached to the side portions 15 and 16 that when the side portions are raised the arms of the prongs will be out of engagement with each other and will not overlap each other. (Shown in Fig. 1 of the drawings.) When, however, the side portions 15 and 16 are lowered and reach their lower limit of movement, the arms of the prongs 22 engage each other and the arms of the prong 24 engage each other and form a circular opening between them.

I have provided braces 25 between rod 11 and the rod 12 of the body portion of the poke, so that these rods will retain their position relative to each other.

In practical use and assuming that the operator desires to place the poke upon an animal he simply gathers the hide of the animal between his hands and draws this hide upwardly a slight distance, and as the hide is usually loose on the neck of an animal on which it is desirable to use a poke the hide will be some distance above the flesh in the neck of the animal. The operator then takes the poke, which is in its open position, as shown in Fig. 1, places the prongs against the hide which he has drawn upwardly, and then presses the side portions 15 and 16 downwardly toward the neck of the animal, and it will be seen that the prongs will pierce the hide which engages them, and the prongs eventually engage each other and form a circular opening between them, and the hide which is between them will be retained and the poke will be firmly attached to the hide of the animal. In placing the poke on the neck of the animal it is usually desirable to have two persons present—one to raise the hide and hold it in its proper position and the other to adjust the poke.

The poke is to be placed on the neck of the animal immediately in front of the shoulders, so that if the animal pushes its head through the fence the upright 14 of the body portion of the poke will engage the wire above its neck, and when this upright 14 engages the wire the hide between the prongs will be drawn, and on account of the sensitiveness of the animal the animal will be stopped from further penetrating the fence.

Having thus described my invention, what I claim, and desire to secure by Letters Patent of the United States therefor, is—

1. In a device of the class described, the combination of a body portion having two sides and two end portions, one of said sides being slightly longer than the other side, two side portions located on said body portion, prongs on said side portions and situated between them when they are at their lower limit of movement, said side portions being substantially the same length as the body portion, for the purposes stated.

2. In a device of the class described, the combination of a body portion, a forward end in said body portion, an upper and lower side substantially at right angles to said forward end, said upper side projecting a slight distance in front of the forward end, a rear end connecting said sides, side portions for my device located on said body portion, prongs attached to said side portions and between them when the side portions are at their lower limit of movement, substantially as and for the purposes stated.

3. In a device of the class described, the combination of a body portion having at its front upper end a projection extending in front of said body portion, side portions attached to said body portion and capable of rotary movement on a portion of said body portion, prongs attached to said sides, said sides and said prongs being designed to hold the device in position on the neck of an animal, substantially as and for the purposes stated.

GUSTAV GRAMKOW.

Witnesses:
WM. NIVEN,
W. R. LANE.